Jan. 19, 1932.  M. E. BENESH  1,842,238
METHOD OF AND APPARATUS FOR MEASURING FLUIDS
Filed Jan. 26, 1925
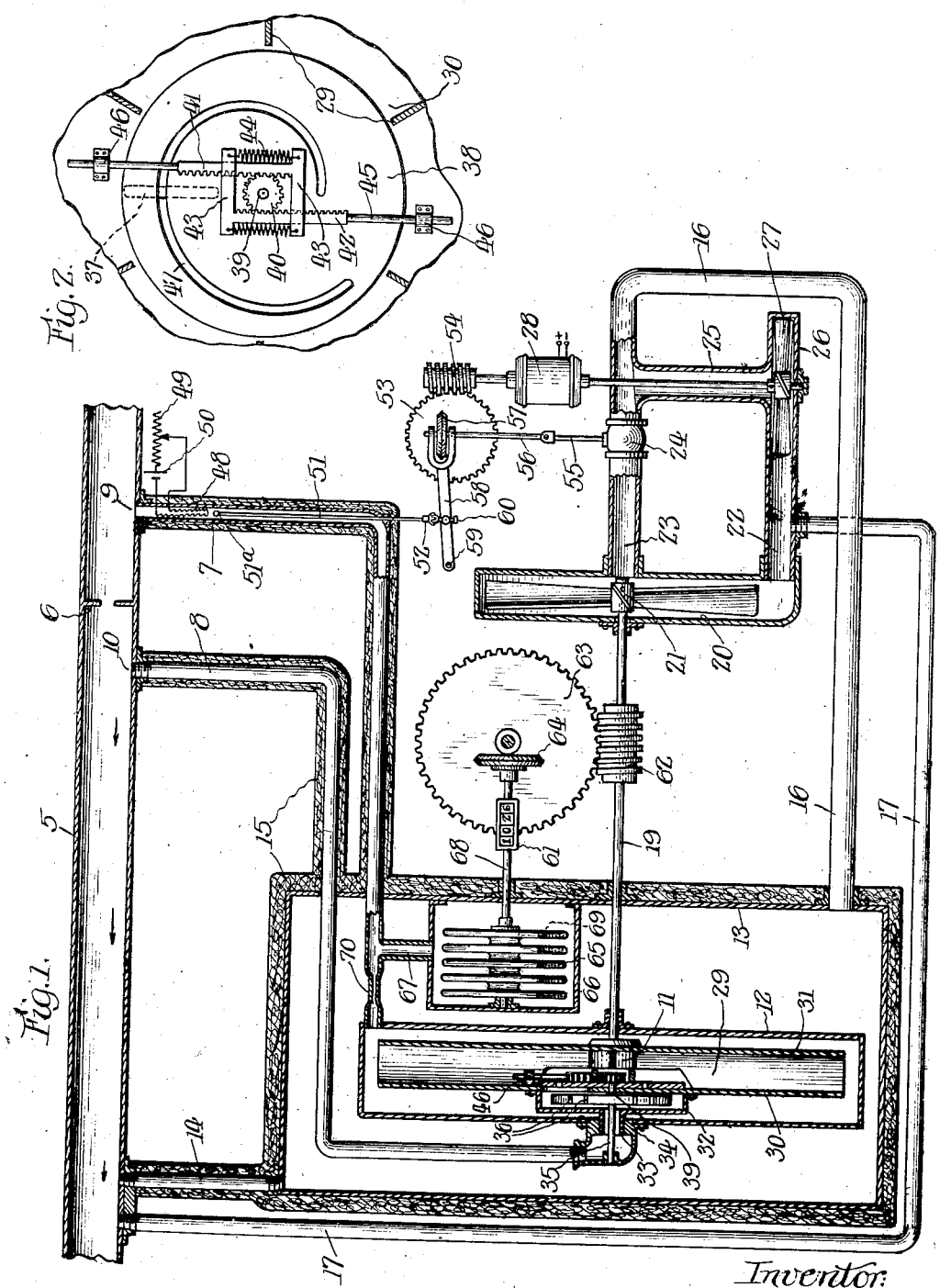
Inventor:
Matthew E. Benesh Patented Jan. 19, 1932

1,842,238

UNITED STATES PATENT OFFICE

MATTHEW E. BENESH, OF CICERO, ILLINOIS

METHOD OF AND APPARATUS FOR MEASURING FLUIDS

Application filed January 26, 1925. Serial No. 4,826.

This invention relates generally to meters and particularly to improvements in the method of and means for measuring fluids, the term fluid being used in the general sense and so including gas, vapor, liquid or mixtures of these.

The measuring of fluid flow as herein contemplated includes the metering of fluids, the flow in a pipe or channel, or the relative motion of fluid and a primary element of a meter as encountered in marine and aeronautical velocity determinations wherein the fluid is relatively stationary.

Fluid meters in general consist of two distance parts; first, the primary element which is in direct contact with the fluid and which is acted upon by it, and second, the secondary element which translates the action of the fluid on the primary element into desired units, which latter units it may indicate, record and integrate.

While this invention is applicable to both positive and inferential classes of meters (into which two classes all fluid meters are here considered to fall) its most valuable application is to that type of inferential meters known as head type meters. In head type meters the action of a stream of fluid on the primary device creates a difference of pressure or a differential head because of the property of the fluid known as inertia. The Venturi flow nozzle, thin plate orifice, Pitot, centrifugal and friction primary elements are examples of head type meters. The venturi, the flow nozzle, and the orifice are head type primary devices in which there is a change of cross section (and therefore of linear velocity) between the two points at which static pressures are taken. The Pitot or impact tube is a head type meter in which use is made of the difference between the static and kinetic pressures at a single section. The centrifugal and friction meters are of the head type which utilize centrifugal change of static pressure across a curved stream, and the loss of pressure due to friction through a certain length of pipe respectively.

Prior to this invention the secondary elements in all of these head type meters have included: (1) a differential pressure gage, or two separate pressure gages from which the differences of pressure may be found; (2) mechanism for translating the pressure difference into rate of flow in accordance with the known law of the primary device; and (3) sometimes mechanism for integrating the rate of flow to give total flow.

The object of this invention is to produce a novel secondary element of a simple and practical character for fluid meters, and to produce one of such a character that it automatically converts the changing or continued differential pressure produced by the action of the fluid on the primary element into rate of flow or total flow as desired.

A further object of the invention is to balance the differential pressure of the primary element, and to automaticaly vary this opposing pressure in accordance with the variations in flow.

A particular object of the invention is to oppose the differential pressure across the primary element by a pressure developed by an enclosed fan and to determine the value of the opposing pressure from the speed of the fan.

A still further object is to provide a compensating adjustment in the fan system, to compensate automatically for variations in the law of the fan and in the law of the primary element.

A particular object is to provide a compensating device which moves the effective air inlet to the fan toward and away from the center of the fan in any desirable relationship to the speed of the fan.

Another object is to provide means to indicate the total revolutions of the fan as a measure of the rate of flow or the total flow.

Still another object of the invention is the provision of control means to adjust the fan speed so that the number of revolutions made by the fan is truly proportional to the true flow, the temporary differences between the fan and the primary element pressures may occur in the automatic adjustment of the balancing means.

Still another object is the provision of means for compensating for the temperature and pressure variations of the fluid being measured.

A still further object of the entire invention is to provide a fluid meter which is independent of the effect of specific gravity of the fluid.

Still other and ancillary objects and advantages of the type of meter herein disclosed will be apparent from the ensuing description.

Primarily the invention in its broadest aspect utilizes a primary element having a known relation between the fluid flow and a pressure head produced by the flow, combined with apparatus which is operated to produce an equal, or effectively equal, and opposite pressure, there being a known relation between the pressure produced by said apparatus and some measurable factor concerned in its operation.

In all of these meters the rate of flow is customarily taken as proportional to the square root of the differential pressure. Prior to this invention the differential pressure was measured in terms of some other fluid than that being measured, and this of necessity introduced many difficulties since the relative densities of the measured and the measuring fluids had to be known. Also, as stated above, a mechanism for taking square roots of this differential is necessary before a rate of flow is determined and a further mechanism is required to integrate this rate and obtain a total flow.

In the present embodiment of this invention, the differential pressure developed by the action of a fluid on the primary element of any head type meter, is balanced by the pressure developed across the inlet and outlet of a centrifugal fan, making use of the same fluid under the conditions obtaining in the primary element. It is well known that under the condition of zero or small flow the pressure developed by a centrifugal fan is practically proportional to the square of the fan speed. This is equivalent to saying that the fan speed is proportional to the square root of the pressure developed by the fan, that is, the pressure between the inlet and the outlet. The rate of flow in a head type meter is also proportional to the square root of the differential pressure produced by the action of the fluid on the primary element. Therefore, when these two pressure differences are balanced or equal, the fan speed is directly proportional to the rate of flow, and consequently the total number of revolutions is proportional to the total flow. Thus, by this invention, the rate of flow can be indicated, being proportional in the present embodiment to the rotative speed of the fan, and the integration is accomplished by a mere revolution counter, which is indicating and registering.

When the fluid flow is required in terms of conditions different from those existing in the fluid a correction may be required for temperature pressure and in the case of gas also saturation. This correction is automatically made by varying the speed ratio of the fan to revolution counter in accordance with the combined effect of these factors.

In the accompaning drawings I illustrate more or less diagrammatically a combination of structures which cooperate to produce a meter of the type described, the parts being correspondingly numbered in the several figures. The device illustrated in the drawings represents a completely operative meter in which the essential features of the invention are exemplified for the purpose of explanation of the character of the invention.

In the drawings, Figure 1 shows a fluid meter especially adapted for measuring gas flow in accordance with the present invention.

Fig. 2 is a detail view of a compensating device associated with the fan.

In the drawings, the numeral 5 represents a gas main in which the flow in the direction shown by the arrows in Fig. 1 is to be determined. In the main 5 there is a suitable primary element here represented by the orifice 6. The action of the fluid flowing through the orifice 6 creates a difference of pressure on the two sides of the primary element. Pipes 7 and 8 lead to the two sides of the primary element, the pipe 7 being up-stream and the pipe 8 being down-stream with relation to the orifice 6. The pipes 7 and 8 lead to a pressure creating means which is of such a character that it is arranged to produce in each pipe a pressure equal to the up-stream and down-stream pressures at the points 9 and 10, these being the points of entry respectively of the pipes 7 and 8. In the present meter the pipes form a closed circuit through a fan 11 enclosed in a fan casing 12, pipe 8 leading to the fan inlet and pipe 7 leading to the fan outlet.

The fan casing 12 and the pipes 7 and 8 are maintained at the same temperatures as the fluid in the main 5 at the primary element 6. This is preferably accomplished by providing a closed housing 13 for the fan casing through which fluid from the main is circulated. An inlet pipe 14 leads from the main 5 into the housing 13. Pipes 7, 8 and 14 and the housing 13 are suitably insulated as indicated generally at 15. An outlet pipe 16 from the housing 13 is connected to a suitable circulating means which draws fluid through the housing from the main 5 and returns it through pipe 17 to the main.

Impelling means is also required to operate the fan system. The circulating means above mentioned may be of any suitable character but I prefer to combine it with the means which produces operation of the fan 11 enclosed in the fan casing 12. A fan shaft 19 is provided extending through the casing 12 and the housing 13 into a second fan casing 20 wherein is located an impeller fan 21 serving as driving means for the fan 11. A peripheral inlet 22 to the impeller fan casing and a central outlet 23 are provided for the impeller 21. In the outlet pipe 23 there is a suitable control valve 24. Pipes 22 and 23 are connected in a continuous circuit by pipe 25, and a blower fan casing 26 is included in the circuit so that a blower fan 27 therein may circulate a fluid in the system to operate the fan 11 in accordance with the degree of opening of the valve 24. In the present instance a portion of the gas which flows through the housing 13 is recirculated to drive the impeller fan 21, since the pipes 16 and 17 are connected so that the blower 27 circulates gas through the housing 13. This is accomplished by tapping pipe 17 into pipe 22 and by connecting pipe 16 to pipe 25. Any suitable driving means as the motor 28 is provided to operate the fan 27.

The fan 11 is, in the present instance, of a centrifugal type with blades 29 thereon between disks 30 and 31. The disk 30 carries on its outside a drum or box 32 into which gas from pipe 8 is adapted to flow axially. The box has a tubular bearing 33 journaled in the fitting 34 in the fan casing and made gas tight with reference to the fan chamber, of the casing 12. The pipe 8 is connected into the fitting 34. A stud or finger 35 rigidly mounted within the fitting 34 carries radially arranged stationary blades 36 resembling a fan in the drum 32, so that as the drum revolves the fluid therein will be held relatively stationary. A slot 37 (Fig. 2) is provided in the fan disk 30 which slot may be of any desired form, herein being shown radially located a short distance from the axial center of the fan. The slot 37 affords communication between the drum 32 and the space between the blades of the fan.

With the gas in the fan casing 12 under the same conditions of temperature, pressure and saturation as in the main pipe 5, it follows that when the pressure differential across the orifice 6 is balanced by the fan 11, the rate of flow (in units of volume under existing conditions per unit time) through the orifice 6 is directionally proportional to the fan speed (revolutions per same unit of time) and the total flow in a given time is proportional to the total number of fan revolutions in the same time. The above assumes that the laws of the fan and of the primary element of the head meter (here orifice 6) are similar. To illustrate, the rate of flow through the orifice is proportional to the square root of the differential pressure developed across openings 9 and 10, and the fan speed is also proportional to the square root of the same differential pressure since a balance obtains.

Such perfect similarity between the law of the primary element and the law of the secondary element is not essential to this invention provided only that both of these laws are known. This is true because of the provision of a compensating device which automatically adjusts for a difference of these laws. Thus, in the present embodiment, the relation between the pressure differential developed by the fan and its speed need not be exactly the same as the relation between the flow and the differential pressure developed by the action of that flow on the primary element.

In the present instance, such a compensation device is provided. This is in the nature of an additional member, the design of which may vary for different meters. It is of such a character that it provides a slot crossing slot 37 at different positions along the slot 37 and so varying the position of the inlet from the center of the fan. In the present instance the position of this slot intersection which forms the effective inlet to the fan depends upon the fan speed. The structure by which this is obtained is as follows: There is provided a disk or plate 38 rotatable with respect to the fan body. The plate 38 is rotatably mounted on disk 30 by a pin 39 rigid with the plate 38. A pinion 40 is also rigid with the plate 38 for actuation by a speed governor which rotates the plate relatively to the fan as the fan speed changes. The governor may be of any desired type. Herein I show interlocked racks 41 and 42 each in mesh with opposite sides of the pinion 40. Each rack passes through an enlarged right angular projection 43 of the other rack, thus forming a rectangular structure expansible in the direction along the racks. Springs 44 alongside of the racks tends to compress the rectangle. Guide extensions 45 at the ends of the racks pass through guide blocks 46 mounted on the fan disk 30. These guide extensions and the meshing relation of the racks with the pinion are the sole support for the speed governor. As the fan rotates at a given speed the plate 38 is carried with it, the rack projections 43 being separated against the springs 44 a distance dependent on the speed of the fan. As the speed changes, the relative motion of the racks causes the pinion 40 to turn the plate to a new position. Hence, for each speed of the fan, plate 38 and disk 30 occupy a given relative position. A slot 47 is provided in the plate 38. Since this plate 38 is rotated by the above described mechanism, the slot 47 crosses slot 37 transversely at any desired position according to the speed of the fan. The proper position and shape of slot 47 in any meter of this character is determined by calibration. Herein slot 47 is shown spiral but it is understood that this is arbitrary and merely exemplary for this instance.

Of course, it is desirable to keep the pressures of the primary element and of the fan continuously balanced against each other. However, when a variation in flow through the main 5 takes place, there will be a corresponding pressure change at the points 9 and 10. If the fan continues to move under these new conditions at its former speed the pressure will be unbalanced and a flow will take place through the fan system. The relative pressures will be only slightly different so that the fan flow will be small. For high precision it is necessary to have very delicate and responsive fan speed governing means which will detect this flow and operate to stop it thereby reproducing the balanced condition. Various mechanical, electrical or other devices may be inserted in the fan system for this purpose.

In the present instance I have provided a thermal fan speed governor which provides high sensitivity. This sensitivity is possible because the inertia of the governor, which a difference in balance in pressure must overcome, is merely the inertia in the governor, the fan and the connections. Such a governor is of great advantage in the null method of balancing pressures here used. Thus, the primary element need not develop a high differential for the meter to give a high order of precision over a very wide range of flow rates. In the insulated up-stream pipe 7 I place a heating element which may be of any character. I prefer an electrically heated grid 48 held at a reasonably constant temperature by a rheostat 49 in series with an electrical energy source 50. In close proximity to the grid 48 and in line with the flow past the grid, I fix to the pipe 7 one end of a thermal expansion element herein illustrated as an expansive rod 51, which passes through the pipe to the outside. The rod 51 is fixed to pipe 7 by a suitable connection 51ª. In a balanced condition of the fan and primary element differential pressures, the element 51 has been raised in temperature to some extent by heat from the grid. By flow of gas from the main into the pipe 7, the gas heated by the grid heats the thermal element to expand it. By a reversal of flow from the pipe 7 into the main the cooler gas in the system (maintained cooler by the lower temperature of housing 13) flows past the thermal element 51 and cools it. Thus, the free end 52 of the thermal element is raised and lowered according to the direction of flow in the fan system. I utilize this motion, which is capable of exerting considerable force, to control the valve 24 in a direction dependent upon the length of the thermal element, any suitable means being interposed between the thermal element 51 and the valve 24. In the present instance, I provide a continuously revolving disk 53 turned by suitable gearing 54 connected to the motor 28. The valve stem 55 of valve 24 is extended at 56 to carry a friction disk 57 which is suitably arranged to engage the disk 53 for turning the valve 24.

In the balanced condition of the meter the point of contact of disk 57 on disk 53 is made at the center of the disk 53 so that no motion of the valve will result. However, if there is a flow through the up-stream pipe 7 into the main 5 it indicates that the fan is revolving faster than is necessary for a balanced condition. Under this condition the thermal element will be cooled by the flow, and to reach a balanced condition, it is necessary that valve 24 be closed to some extent. This is effected by maintaining the disk 57 slidable on the extension 56 and by engaging it in the bifurcated end of a lever 58 pivoted at 59. The thermal element 51 is secured to the lever 58 by a screw adjustment 60 so that the relative position of the end of the element 51 and the lever 58 may be varied. By suitably proportioning these parts to the characters of the valve 24 and of the blower fan 27, the fan 11 will be automatically maintained at the speed necessary for the fan to balance the pressure differentil developed by the action of the fluid on the primary element.

From the foregoing, it will be clear that the number of revolutions made by the fan 11 in a given time will be directly proportional to the total flow through main 5 in the same time, just as in a meter of the positive class, and the number of revolutions will be in terms of units of volume of the fluid under the conditions in the main. When it is desired to express this volume in terms of some standard conditions of temperature and pressure, and in the case of gas, saturation, or when it is desired to use some other units than volume, such as mass, it is necessary to apply a correction. In this meter the correction is applied automatically by varying the speed ratio between the fan 11 and a register in the form of revolution counter 61. The ratio is provided by suitable gearings 62 and 63 from the fan shaft 19, gear 63 being used to drive the register. The speed ratio between the register 61 and the gear 63 is variable by any suitable means. In the present instance this consists of a friction wheel 64 operating the register which engages on the face of gear 63 at varying distances from the center. An expansible diaphragm or bellows is fixed at one end in a closed chamber 66 located within the housing 13. The bellows is filled with a fluid following the same law as the fluid being measured and is then sealed. A pipe 67 affords communication from the chamber 66 to either one of the pipes 7 or 8, in the present instance the nearest pipe 7 being chosen. As the temperature and pressure in the chamber 66 vary, the bellows 65 operates a plunger 68 which carries the register 61 and friction wheel 64. Since the temperature of the housing 13 is maintained the same as the main, and since the pressure in chamber 66 is that used in deriving the law of the primary element, the results will, of course, be the same as if the bellows were placed in the main at the point 9 in the present instance. Thus, the combined effect of temperature and pressure which exists in main 5 causes the bellows 65 to move the friction wheel 64 so as to change the speed ratio of the fan 11 to register 61, to compensate for this pressure-temperature change so that register 61 always indicates in standard units. Furthermore, if the gas in main 5 is saturated with water vapor and it is desired to correct for this, a small quantity of water 69 is placed inside the bellows 65.

It is apparent that the adjustment of the differential pressure developed by the secondary element so as to balance the differential pressure developed by the action of the fluid on the primary element, requires an appreciable time with the described or any other type of fan speed governor. Other types of governors such as purely mechanical types (not thermal) may easily be made to have less, but not zero, time lag, but at a sacrifice of sensitivity. As before explained, the action of the thermal fan speed governor here described should be such that it adjusts the speed of the fan 11 so that the total gas flowing over expansion element 51 in one direction is equal to the total flow in the opposite direction. Since in normal use neither the flow in main 5 nor the speed of power motor 28 are constant, and since there are lags in the adjustment of the speed of fan 11 to balance the flow of differential, it is important for the most accurate working of the meter that the flow in the main 5 corresponding to these small temporary differences between the fan and true flow differentials be integrated by the fan with the desired precision. Therefore, I provide a flow control means, which, in conjunction with the fan speed governor, assures the desired precision in integration by the fan of these small temporary differences between the fan and true flow differentials of the primary element.

The total quantity of gas flowing in either direction over the expansion element 51 is controlled by a so-called fan flow control which is preferably constructed as a constricted passage 70 in the fan connection 7. This particular one is so designed that its flow coefficient is the same for both directions of flow and so that it offers practically the total resistance to flow through the fan speed governor, the fan 11 and its connection pipes 7 and 8. That the flow coefficient of the fan flow control be the same in both directions is preferred but this is not indispensable. If desired, the flow coefficient of the flow control 70 in one direction of flow may be made different from that in the opposite direction through the flow control so as to automatically compensate for variations of the law of the fan due to a flow occurring through it. If the flow coefficient of the flow control is not the same in both directions of flow through it, periodically reversing the connections to the fan flow control amounts to having the coefficient the same in both directions. When necessary mechanism for periodically reversing the connections may be provided. It is preferable that such periodic reversing means be timed with respect to the rotations of the fan shaft 19, whereby the periods of reversal will be controlled not by time but in accordance with flow in main 5. Any suitable means may be employed for this purpose. In the present instance where small variations in the flow differential are provided for and where a clean gas is handled, this is not required.

Although the fan flow control 70 is here shown as a constricted portion of the pipe 8, it will be understood that its design will in general depend upon the primary element with which it is to be used, the flow conditions, and the metering precision desired. In general, the flow through the fan flow control 70 will be proportional to some other power of differential head causing the flow (the difference between the fan and primary element differentials) than the power of the differential head to which the flow in the primary element is proportional. For example, as in the present instance, where the flow through the orifice 6 is here considered proportional to the one-half power of the differential developed across it, then for ordinary precision, the flow through the fan flow control 70 may be considered proportional to the first power of the differential pressure acting across it, i. e., to the difference between the differentials of fan 11 and orifice 6. It is to be understood that the flow control means may be varied in structure and operation in accordance with the above suggestions as required by the parts with which it is associated.

*Operation*

In the above described meter with no flow in main 5, the following conditions obtain. Zero flow through the main gives zero differential pressure between points 9 and 10. This means that the differential developed by the fan 11 is also zero and that the fan is stationary. Grid 48 is at its reasonably constant temperature and the rod 51 holds the friction wheel 57 in the neutral position on gear 53, valve 24 being closed. The motor 28 is continuously operating whereby the temperature of housing 13 is maintained at the same temperature as the fluid in the main 5.

As soon as a flow starts through main 5 and the orifice 6, a flow of gas also starts into pipe 7. This gas being heated in passing over grid 48, raises the temperature of the rod 51 and so causes valve 24 to be opened, which results in rotation of the fan 11, tending to balance the differential pressure across orifice 6.

When the differential pressure developed by fan 11 exceeds that developed by the flow through orifice 6, the reverse takes place, that is, the gas from the fan flows over and lowers the temperature of the expansion rod 51 thereby gradually closing the valve 24 and reducing the speed of the fan 11.

Under the ideal condition of a constant rate of flow through the orifice 6 and with a perfectly constant speed of motor 28, the fan speed will be constant, the fan speed governor will be in neutral position, and the registration at counter 61 will at all times be precisely proportional to the total flow through orifice 6, even though the temperature, pressure and specific gravity of the gas should vary.

Normally such conditions do not obtain in practice. Neither the flow through the orifice nor the motor speed will be constant. To illustrate the action of these variations it may be assumed that the speed of the motor 28 is constant and that the flow varies as now to be explained. It is understood that this variation is relative and that the example will apply when either or both flow and motor speed variations occur.

Starting with a perfect balance between the fan and the flow differentials (that is, friction wheel 57 at neutral position), let the flow in main 5 be increased to a new constant value. The resulting flow of gas over grid 48 will expand rod 51, displace the wheel 57 from neutral position in a direction to cause valve 24 to be further opened and so increase the speed of the fan 11. The speed of fan 11 will continue to be increased so long as the position of wheel 57 is on the opening side of neutral position. Thus, when the fan differential exactly balances the new constant value of the flow differential, the friction wheel is still on the opening side of neutral position and continues to cause increase in speed of the fan 11. Thus, the fan differential exceeds the flow differential and a reverse of the preceding operation takes place, that is, the flow from fan 11 over rod 51 cools the rod 51 and returns wheel 53 to neutral poistion. It would appear from this that the system will continue to so hunt under constant flow and constant speed conditions. However, the construction of the fan speed governor is such that there is a slight but adequate heat loss from the rod 51 at all times. In the present instance, this may take place at the support 51ª of the rod 51 to pipe 7. This serves as a damping means so that successive oscillations under these ideal conditions grow less.

At each instant when the disk 53 is at its neutral position the registration of counter 61 gives precisely the true total flow through main 5 up to that instant. This is happening frequently since the wheel 57 normally shifts an equal number of times to either side of neutral. When the disk is at a position other than neutral, the registration of counter 61 differs from the precise total flow by merely the small increment or decrement due to the temporary unbalanced condition between fan and flow differentials. This, it will be apparent, since it is not cumulative, is for all practical purposes entirely negligible.

In the above description of the illustrated embodiment of the invention, it is to be understood that various parts may be replaced by equivalent devices of varying nature. For example, the fan impeller 21 and the control valve 24 therefor may be replaced by an electrical driving and control means. The fan speed governor, including the grid 48 and the thermal element 51 with the operating mechanism to valve 24, may be replaced by any other flow detecting and governing means. The fan flow control 70 may be of another character and may be incorporated into the fan speed governor in the fan system to serve as the fan flow control, flow detector and fan speed governing means.

It will thus be seen that I have provided a type of meter which is suitable for the measurement of fluid whether it be gas, vapor or liquid or a mixture of these. It is an important feature of meters embodying this invention that in measuring fluids they will register the rate of flow or total flow in terms of any desired units, that is, the registration is independent of changes in density of the fluid. Furthermore, in the case of a saturated gas the registration may be corrected for saturation to the desired basis and is independent of changes in specific gravity, temperature and pressure.

To one skilled in the art it may readily occur from the above that many other applications of the broad principle of balancing pressures are possible by using certain of the elements of this invention.

The above described and illustrated embodiment of the invention is not to be construed as a limitation of the invention and many other embodiments thereof are contemplated herein as will be clear from the expression of the invention in the appended claims.

I claim as my invention:

1. A flow meter comprising, in combination, a primary element adapted to produce a differential pressure in known relation to the flow acting on said element, an encased fan adapted to produce a pressure in known relation to the speed of the fan, means to drive the fan, communicating means for fluid between the fan and the flow element whereby the pressures of each may oppose each other, fan speed controlling means, associated with said communicating means, said speed controlling means being responsive to the flow of fluid through said communicating means, whereby a fluid flow through said communicating means operates to affect the fan driving means to change the speed of the fan thereby tending to balance the opposed pressures, the speed of the fan being indicative of the rate of flow in the balanced condition of the pressures.

2. A flow meter comprising, in combination, a primary element adapted to produce a differential pressure in known relation to the flow acting on said element, an encased fan adapted to produce a differential pressure in known relation to the speed of the fan, means to drive the fan, communicating means between the fan and the primary element whereby the pressures of each may oppose each other, a heating means in said communicating means, a thermal expansion element in line with and near said heating means, said thermal element being arranged for expansion and contraction as its temperature is changed by a flow of fluid to or away from the heating means past said thermal element, and means operated by said thermal element to vary the speed of the fan to effect a balancing of pressure in said communicating means to prevent a flow therein, whereby the speed of the fan indicates the flow acting on the primary element.

3. A flow meter comprising, in combination, a primary element adapted to produce a differential pressure in known relation to the flow acting on said element, an encased fan adapted to produce a pressure in known relation to the speed of the fan, a fluid operated motor to turn the fan, a valve to control the fluid for said motor, communicating means between the fan and the primary element whereby the pressure of one may oppose the pressure of the other, a heating member in said communicating means, a thermal expansion element in line with and near said heating member, said element being arranged for expansion and contraction as its temperature is changed by a flow of fluid to or away from the heating member past said thermal element, a rotating disk, a friction wheel engaging said disk, means operatively connecting said friction wheel to said valve and effective upon rotation of said wheel to adjust said valve, means connected to said thermal element and to said friction wheel to hold the latter in position to engage the rotating disk at the center thereof in the balanced condition of the two pressures, said connecting means being moved by a variation in the length of the thermal element to move the friction wheel in contact with said rotating disk on either of the opposite sides of the center whereby to vary the fluid flowing through said valve to said motor to change the speed of the fan to a pressure-balancing speed.

4. A flow meter comprising, in combination, a primary element adapted to produce a differential pressure in known relation to the flow acting on said element, an encased fan adapted to produce a differential pressure in known relation to the speed of the fan, means to drive the fan, communicating means between the fan and the primary element whereby the pressure of each may oppose the pressure of the other, a heating member in said communicating means, a thermal expansion element in line with and near said heating member, said thermal element being arranged for expansion and contraction as its temperature is changed by a flow of fluid to or away from the heating means past said thermal element, a power operated control to vary the speed of the fan, said control comprising a driving element, a power driven element adapted to have a neutral, forward or backward connection with said driving element, and means connecting said driven element to said thermal element and operable by said thermal element to effect connection in neutral, forward, or backward relation of said driven element to said driving element, the neutral relation existing during a balanced relation of the pressures, and the other relations existing to reproduce the balanced condition of pressures.

5. A fluid meter comprising, in combination, a primary element adapted to produce a differential pressure in known relation to the flow acting on said element, an encased fan adapted to produce a pressure in known relation to the speed of the fan, means arranged to oppose the pressure of the primary element against the pressure of the fan whereby when said pressures are unequal a flow takes place through said means and through the encased fan, and a fan flow control having a control element arranged in said means and responsive to the flow through said means, said flow control being operable to limit the flows through said fan so that these flows have a predetermined relation to the differences in the opposing pressures producing them.

6. A fluid meter comprising, in combination, a primary element adapted to produce a differential pressure in known relation to the flow acting on said element, an encased fan adapted to produce a pressure in known relation to the speed of the fan, communicating means arranged to oppose the pressures of the primary element and of the fan, whereby when said pressures are unequal a flow takes place through said means and through the encased fan, said communicating means having a constricted opening therein adapted to resist a flow of fluid therethrough in an unbalanced condition of the pressures, and being further adapted to permit unresisted communication therethrough when the pressures are balanced.

7. A fluid meter comprising, in combination, a main for fluid, a primary element in said main adapted to produce a differential pressure in known relation to the flow acting on said element, an encased fan adapted to produce a pressure in known relation to the speed of the fan, means permitting opposition of said pressures, a housing surrounding said encased fan, means arranged to circulate fluid from the main through said housing whereby to keep the temperature of the fan casing the same as the temperature of the fluid in the main, and means adapted to drive the fan through the action of the circulating fluid.

8. A fluid meter comprising, in combination, a main for fluid, a primary element in said main adapted to produce a differential pressure in known relation to the flow acting on said element, an encased fan adapted to produce a pressure in known relation to the speed of the fan, means permitting opposition of said pressures, a housing surrounding said encased fan, and means arranged to circulate fluid from the main through said housing whereby to keep the temperature of the fan casing the same as the temperature of the fluid in the main.

9. A fluid meter comprising, in combination, a primary element adapted to produce a differential pressure in known relation to the flow acting on said element, an encased fan adapted to produce a pressure in known relation to the speed of the fan, means permitting opposition of said pressures, a housing for said encased fan, circulating means arranged to circulate fluid from the main through said housing whereby to keep the temperature of the fan casing the same as the fluid in the main, a closed circuit included in said circulating means, a fan in said closed circuit, a valve in said circuit, means in said first mentioned means responsive to variations in flow due to a difference in said pressures, means connecting said last mentioned means to said valve to adjust said valve so as to control the speed of said last mentioned fan, and means in said circulating means to drive said first mentioned fan to a speed proportional to the opening of said valve so that said pressures will be balanced.

10. A fluid meter comprising, in combination, a primary element adapted to produce a differential pressure in known relation to the flow, an encased fan adapted to produce a pressure in known relation to the speed of the fan, connecting means for bringing said pressures into opposition, means providing an inlet to the fan, and means including a part adjustably coacting with said inlet to define an effective opening therethrough, said last mentioned means being carried by the fan for adjusting the location of the effective opening through said inlet to the fan relatively to the center in a manner predetermined by the speed of the fan, whereby the speed of the fan may be made directly proportional to the rate of flow through said primary element.

11. A fluid meter comprising, in combination, a primary element adapted to produce a differential pressure in known relation to the flow, an encased fan adapted to produce a pressure in known relation to the speed of the fan, connecting means for bringing said pressures into opposition, means providing an inlet to the fan, a certrifugal governor device on said fan movable to a predetermined position according to the speed of the fan, and means coacting with said inlet to define an effective opening therethrough, and being operable by said governor to adjust the effective opening through the inlet radially of the fan to a position determined by the speed of the fan.

12. A fluid meter comprising, in combination, a primary element adapted to produce a differential pressure in known relation to the flow, an encased fan adapted to produce a pressure in known relation to the speed of the fan, means to balance the pressures, a register to integrate the revolutions of the fan directly in flow units, and variable speed gearing between said fan and said register, and means subject to the temperature and pressure of the fluid flowing through said fan for adjusting said gearing to compensate for changes in the proportionality factor between the flow units and revolutions.

13. In a gas flow meter having a member revolving at a speed proportional to the rate of flow through a gas main, a register operated by said member, a variable ratio friction gearing between the register and the revolving member, a single expanding means affected by changes in temperature and pressure in the main, and operating means associated with the expanding means and the friction gearing to vary the driving ratio between the member and the register.

14. In a gas flow meter having a member revolving at a speed proportional to the rate of flow through a gas main, a register operated by said member, a variable ratio friction gearing between the register and the revolving member, a sealed bellows containing gas maintained under the same temperature and pressure as the gas in the main, and means connecting said bellows with said friction gearing whereby to alter the driving ratio between the register and the revolving member.

15. In a fluid meter of the class described having two opposing differential fluid pressures, a communicating system for said opposing pressures wherein a flow of fluid takes place when said opposing pressures are unbalanced, means responsive to a flow in said system, means actuated by said responsive means to cause said opposing pressures to be balanced, a device for retarding the flow through said communicating system, said device permitting unrestricted static pressure communication, whereby the desired precision in metering is obtained, and damping means in said system operable to decrease successive flows through said system to approach a balanced condition of the pressures.

16. A fluid meter of the class described comprising, in combination, a source of differential pressure, an encased fan, connections from the inlet and outlet of said fan to said source of differential pressure, means to operate the fan, control means to regulate the speed of the fan to balance the differential pressure of the fan against the differential pressure of said source, said last mentioned means including actuating means in the connections responsive to a flow through the connections caused by unbalanced pressures, the actuation being effected in such a manner that a flow in one direction slows the fan and a flow in the other direction speeds up the fan, and a device for retarding the flow through said connections, said device permitting unrestricted static pressure communication, whereby the desired precision in metering is obtained.

17. A fluid meter of the class described comprising, in combination, a source of differential pressure, an encased fan, connections from the inlet and outlet of said fan to said source of differential pressure, means to operate the fan, control means to regulate the speed of the fan to balance the differential pressure of the fan against the differential pressure of said source, said last mentioned means including actuating means in the connections responsive to a flow through the connections caused by unbalanced pressures, the actuation being effected in such a manner that flow in one direction slows the fan and a flow in the other direction speeds up the fan, and a portion in one of said connections formed into restricted passage having known coefficients of flow in both directions, said coefficients of flow being chosen to effect the desired precision in metering even though there are temporary differences between opposing pressures.

18. A fluid meter having, in combination, a primary element wherein the differential pressure is approximately proportional to the square of the fluid flow, a fan arranged to produce a differential pressure approximately proportional to the square of the speed of the fan, connecting means permitting the opposition of said differential pressures, a fan flow control in said means in the form of a constricted tubular passage having a flow coefficient in both directions which varies approximately as the first power of the differential pressure acting on said passage, whereby to effect the desired precision in metering, even though there are temporary differences between the fan and true flow differential pressures, a drive for said fan, means responsive to the flows caused by said differences, and a fan speed governor operable by said means to effect changes in the fan speed in a direction to vary the fan flow.

19. A fluid meter having a primary element wherein the action of the fluid flow produces a differential pressure in said element, means housing a body of said fluid, means to hold said body of fluid at the same conditions of temperature as prevail at the primary element, means acting upon said body of fluid in such a manner as to produce a differential pressure therein, the differential pressure of said means having a known relation to its operation, means permitting opposition of said differential pressures, whereby the operation of said means in balancing said differential pressures becomes a measure of the fluid flow acting upon the primary element.

In testimony whereof, I have hereunto affixed my signature.

MATTHEW E. BENESH.